United States Patent
Allen et al.

(10) Patent No.: US 7,470,320 B1
(45) Date of Patent: *Dec. 30, 2008

(54) NANOSIZED PARTICLES OF MONOAZO LAKED PIGMENT WITH TUNABLE PROPERTIES

(75) Inventors: C. Geoffrey Allen, Waterdown (CA); Rina Carlini, Oakville (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,469

(22) Filed: Nov. 1, 2007

Related U.S. Application Data

(63) Continuation-in-part of application No. 11/759,913, filed on Jun. 7, 2007.

(51) Int. Cl.
*C09B 67/20* (2006.01)
*C09B 63/00* (2006.01)

(52) U.S. Cl. ..................... 106/496; 106/402
(58) Field of Classification Search ............... 106/402, 106/496
See application file for complete search history.

(56) References Cited

U.S. PATENT DOCUMENTS

| | | | |
|---|---|---|---|
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,372,852 A | 12/1994 | Titterington et al. | |
| 5,403,693 A | 4/1995 | Patel et al. | |
| 5,418,108 A | 5/1995 | Kmiecik-Lawrynowicz et al. | |
| 5,597,856 A | 1/1997 | Yu et al. | |
| 5,679,138 A | 10/1997 | Bishop et al. | |
| 5,997,628 A * | 12/1999 | Bindra ............ 106/496 | |
| 6,174,937 B1 | 1/2001 | Banning et al. | |
| 6,399,713 B1 | 6/2002 | MacQueen et al. | |
| 6,492,458 B1 | 12/2002 | Pavlin et al. | |
| 6,537,364 B2 | 3/2003 | Dietz et al. | |
| 6,837,918 B2 | 1/2005 | Pozarnsky et al. | |
| 6,989,055 B2 * | 1/2006 | Kitamura et al. ......... 106/402 |
| 2003/0065084 A1 | 4/2003 | MacQueen et al. | |
| 2003/0199608 A1 | 10/2003 | Kamigaki et al. | |
| 2005/0109240 A1 | 5/2005 | Maeta et al. | |
| 2006/0063873 A1 | 3/2006 | Lin et al. | |
| 2007/0012221 A1 | 1/2007 | Maeta et al. | |
| 2007/0120921 A1 | 5/2007 | Carlini et al. | |
| 2007/0120924 A1 | 5/2007 | Odell et al. | |

FOREIGN PATENT DOCUMENTS

| | | |
|---|---|---|
| GB | 2 238 792 | 6/1991 |
| JP | 2005238342 A2 | 9/2005 |
| JP | 2007023168 | 2/2007 |
| JP | 2007023169 | 2/2007 |
| WO | 2004026967 | 4/2004 |
| WO | 2006/005536 | 1/2006 |
| WO | 2006005521 | 1/2006 |
| WO | 2006/011467 | 2/2006 |
| WO | 2006/024103 | 3/2006 |
| WO | 2006/123443 | 12/2006 |

OTHER PUBLICATIONS

U.S. Appl. No. 11/759,906, filed Jun. 7, 2007.
Hideki Maeta et al., "New Synthetic Method of Organic Pigment Nano by Particle Micro Reactor System," http://aiche.confex.com/aiche/s06/preliminaryprogram/abstract_40072.htm (date unknown).
K. Balakrishnan et al., "Effect of Side-Chain Substituents on Self-Assembly of Perylene Diimide Molecules: Morphology Control," *J. Am. Chem. Soc.*, vol. 128, p. 7390-98 (2006). [no month].
Kazuyuki Hayashi et al., "Uniformed nano-downsizing of organic pigments through core-shell structuring," Journal of Materials Chemistry. 17(6), 527-530 (2007). [no month].
Kento Ujiiye-Ishii et al., "Mass-Production of Pigment Nanocrystals by the Reprecipitation Method and their Encapsulation," *Molecular Crystals and Liquid Crystals*, v. 445, p. 177 (2006). [no month].

* cited by examiner

*Primary Examiner*—Anthony J Green
(74) *Attorney, Agent, or Firm*—Oliff & Berridge, PLC

(57) ABSTRACT

A nanoscale pigment particle composition includes an organic monoazo laked pigment including at least one functional moiety, and a sterically bulky stabilizer compound including at least one functional group, wherein the functional moiety on the pigment associates non-covalently with the functional group of the stabilizer; and the nanoscale pigment particles have an average particle size of from about 10 nm to about 500 nm and have tunable coloristic properties that depend on both particle composition and average particle size.

16 Claims, 2 Drawing Sheets

NANOSIZED PARTICLES OF MONOAZO LAKED PIGMENT WITH TUNABLE PROPERTIES

This application is a continuation-in-part of U.S. patent application Ser. No. 11/759,913 to Rina Carlini et al. filed Jun. 7, 2007, the entire disclosure of which is incorporated herein by reference.

TECHNICAL FIELD

This disclosure is generally directed to nanoscale pigment particle compositions, and methods for producing such nanoscale pigment particle compositions, as well as to uses of such compositions, for example, in ink compositions. More specifically, this disclosure is directed to organic mono-azo laked nanoscale pigments with tunable properties such as particle size, coloristic properties, and properties as pigmented liquid dispersions. Such particles are useful, for example, as nanoscopic colorants for such compositions as inks, toners and the like.

CROSS-REFERENCE TO RELATED APPLICATIONS

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third mixture and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in commonly assigned U.S. patent application Ser. No. 11/759,906 to Maria Birau et al. filed Jun. 7, 2007, is a nanoscale pigment particle composition, comprising: a quinacridone pigment including at least one functional moiety, and a sterically bulky stabilizer compound including at least one functional group, wherein the functional moiety of the pigment associates non-covalently with the functional group of the stabilizer; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment or pigment precursor including at least one functional moiety and (b) a liquid medium; preparing a second solution comprising: (a) a sterically bulky stabilizer compound having one or more functional groups that associate non-covalently with the pigment functional moiety, and (b) a liquid medium; combining the first solution into the second solution to form a third reaction mixture which forms a quinacridone pigment composition of nanoscale particle size and wherein the functional moiety of the pigment associates non-covalently with the functional group of the stabilizer. Still further is disclosed a process for preparing nanoscale quinacridone pigment particles, comprising: preparing a first solution comprising a quinacridone pigment including at least one functional moiety in an acid; preparing a second solution comprising an liquid medium and a sterically bulky stabilizer compound having one or more functional groups that associate non-covalently with the functional moiety of the pigment; treating the second solution with the first solution to precipitate quinacridone pigment of nanoscale particle size, wherein the functional moiety of the pigment associates non-covalently with the functional group of the stabilizer.

The entire disclosure of the above-mentioned application is totally incorporated herein by reference.

BACKGROUND

Pigments are a class of colorants useful in a variety of applications such as, for example, paints, plastics and inks, including inkjet printing inks. Dyes have typically been the colorants of choice for inkjet printing inks because they are readily soluble colorants which enable jetting of the ink. Dyes have also offered superior and brilliant color quality with an expansive color gamut for inks, when compared with conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water/solventfastness). In certain situations, pigments are the better alternative as colorants for inkjet printing inks since they are insoluble and cannot be molecularly dissolved within the ink matrix, and therefore do not experience colorant diffusion. Pigments can also be significantly less expensive than dyes, and so are attractive colorants for use in all printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for small, nano-sized pigment particles that possess some or all of the aforementioned properties, in order to minimize or avoid the problems associated with using conventional larger-sized pigment particles in inks and toners. The present nanosized pigment particles are useful in for example paints, coatings and inks (e.g., inkjet printing inks) and other compositions where pigments can be used such as plastics, optoelectronic imaging components, photographic components and cosmetics among others.

Whether formulated for office printing or for production printing, printing inks and toners are expected to produce images that are robust and durable under stress conditions, such as exposure to abrasive or sharp objects or actions that produce a crease defect in the image (such as folding or scratching the imaged paper). For example, in a typical design of a piezoelectric ink jet device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Inkjet printing inks comprised of pigments should have appropriate viscosity characteristics under various shear forces, so as to enable reliable jetting of the pigmented ink. There is a need to nanosized pigments having suitable dispersion and viscosity properties to enable optimum jetting performance and ultimately, printhead reliability.

The following documents provide background information:

Hideki Maeta et al., "New Synthetic Method of Organic Pigment Nano Particle by Micro Reactor System," in an abstract available on the internet, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

U.S. Patent Application Publication No. 2003/0199608 discloses a functional material comprising fine coloring particles having an average primary particle diameter of 1 to 50 nm in a dried state, and having a BET specific surface area value of 30 to 500 m.sup.2/g and a light transmittance of not less than 80%. The functional material composed of fine coloring particles, exhibits not only an excellent transparency but also a high tinting strength and a clear hue.

WO 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 µm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale pigment particle compositions, and methods for producing such nanoscale pigment particle compositions.

In an embodiment, the present disclosure provides a nanoscale pigment particle composition, comprising:

an organic monoazo laked pigment including at least one functional moiety, and a sterically bulky stabilizer compound including at least one functional group, wherein the functional moiety of the pigment associates non-covalently with the functional group of the stabilizer; and the nanoscale pigment particles have an average particle size ranging from about 10 nm to about 500 nm and have tunable coloristic properties. For example, when dispersed in a colorless, transparent polymer binder for making thin film coatings, the nanoscale particles of monoazo laked pigments exhibit coloristic properties that are correlated and tunable with average pigment particle size as well as the composition of the pigment with associated stabilizer.

In another embodiment, the present disclosure provides processes for preparing nanoscale-sized monoazo laked pigment particles, comprising:

providing an organic pigment precursor to a monoazo laked pigment that contains at least one functional moiety, providing a sterically bulky stabilizer compound that contains at least one functional group, and carrying out a chemical reaction to form a monoazo laked pigment composition, whereby the functional moiety found on the pigment precursor is incorporated within the monoazo laked pigment and non-covalently associated with the functional group of the stabilizer, so as to allow the formation of nanoscale-sized pigment particles.

DETAILED DESCRIPTION OF EXEMPLARY EMBODIMENTS

Figure 1:
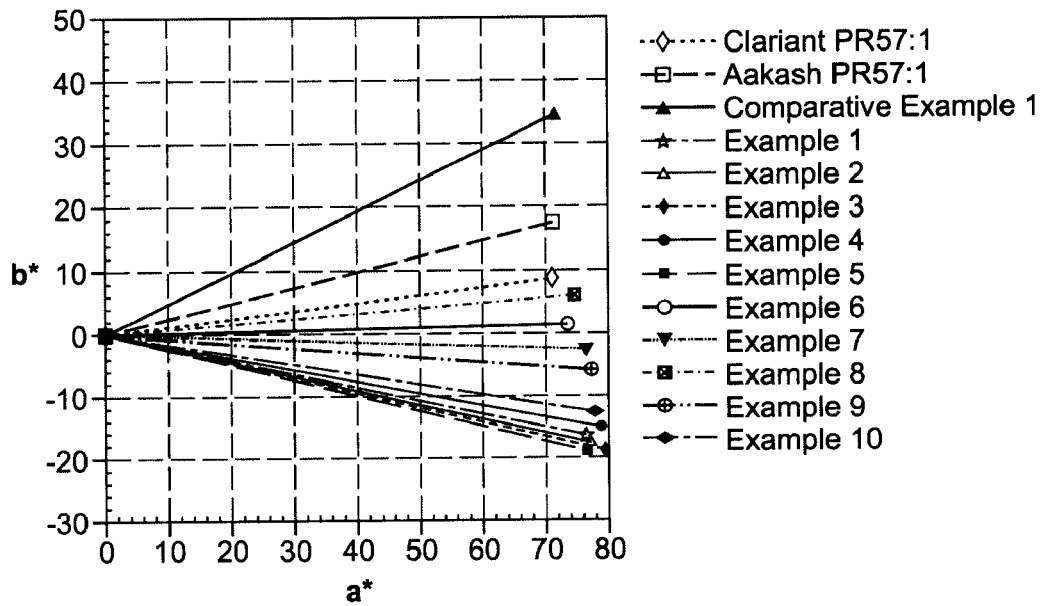
FIG. 1 shows a b* a* Gamut for pigmented coatings prepared with example PR57:1 pigments (Magenta Optical Density=1.5).

Embodiments of the present disclosure provide nanoscale pigment particle compositions, and methods for producing such nanoscale pigment particle compositions. The nanoscale pigment particle compositions generally comprise an organic monoazo laked pigment including at least one functional moiety that associates non-covalently with a functional group from a sterically bulky stabilizer compound. The presence of the associated stabilizer limits the extent of particle growth and aggregation, to afford nanoscale particles. The nanoscale pigment particles have an average particle size of from about 10 nm to about 500 nm and have coloristic properties that are that are correlated and tunable with average pigment particle size as well as the composition of the pigment and associated stabilizer.

forms, such as the "azo" tautomer form which has the (N=N) linkage, and the "hydrazone" tautomer form which has the (C=N—NH—) linkage that is stabilized by an intramolecular hydrogen bond, where the hydrazone tautomer is known to be the preferred structural form for PR 57:1.

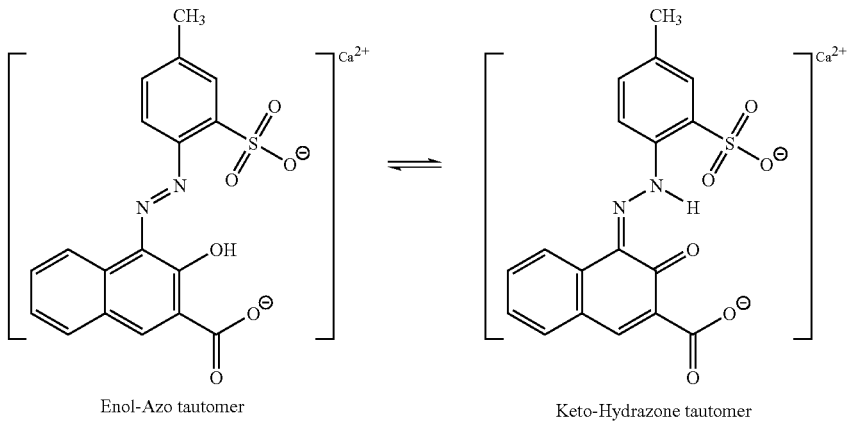

Enol-Azo tautomer    Keto-Hydrazone tautomer

Organic monoazo "laked" pigments are the insoluble metal salt colorants of monoazo colorants which can include monoazo dyes or pigments, and in certain geographic regions these pigments have been referred to as either "toners" or "lakes". The process of ion complexation with a metal salt, or "laking" process, provides decreased solubility of the non-ionic monoazo pigment, which can enhance the migration resistance and thermal stability properties of a monoazo pigment, and thereby enable the applications of such pigments for robust performance, such as colorizing plastics and heat-stable paints for outdoor use. Formula 1 depicts a general representation of monoazo laked pigments, which are ionic compounds that are structurally comprised of a diazo group (denoted $G_d$) and a nucleophilic coupling group (denoted as $G_c$) that are linked together with one azo (N=N) functional group, and a cation ($M^{n+}$) which is typically a metal salt. Either or both of the groups $G_d$ and $G_c$ can contain one or more ionic functional moieties (denoted as FM), such as sulfonate or carboxylate anions or the like.

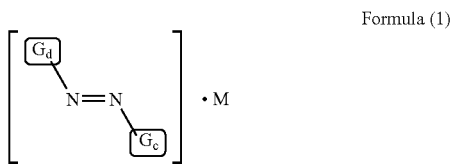

Formula (1)

As an example, the organic monoazo laked pigment PR 57:1 ("PR" refers to Pigment Red) has two functional moieties of two different types, a sulfonate anion group ($SO_3^-$) and carboxylate anion group ($CO_2^-$) and a metal counter-cation $M^{n+}$ that is chosen from Group 2 alkaline earth metals such as $Ca^{2+}$. Other monoazo laked pigment compositions also exist that have a counter-cattion chosen from either Group 2 alkaline earth metals (Be, Mg, Ca, Sr, Ba,), Group 3 metals (B, Al, Ga), Group 1 alkali metals (Li, Na, K, Cs), the transition metals such as Cr, Mn, Fe, Ni, Cu, Zn, or others non-metallic cations such as ammonium ($NR_4^+$), phosphonium ($PR_4^+$) wherein R-group can be H or alkyl group having from about 1 to about 12 carbons. Further, the azo group in the compounds can generally assume one or more tautomeric It is understood that formula (1) is understood to denote both such tautomer forms. Due to the structural nature of monoazo laked pigments being ionic salts, it is possible to have compounds that associate non-covalently with the pigment, such as organic or inorganic ionic compounds that can associate with the metal cation through ionic or coordination-type bonding. Such ionic compounds are included in a group of compounds which herein are referred to as "stabilizers", and that function to reduce the surface tension of the pigment particle and neutralize attractive forces between two or more pigment particles or structures, thereby stabilizing the chemical and physical structure of the pigment. The term "complementary" as used in "complementary functional moiety" of the stabilizer indicates that the complementary functional moiety is capable of noncovalent chemical bonding with the functional moiety of the organic pigment and/or the functional moiety of a pigment precursor.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In embodiments, the precursor to the organic pigment may or may not be a colored compound. In still other embodiments, the precursor and the organic pigment can have different functional moieties. In embodiments, where the organic pigment and the precursor have a structural feature or characteristic in common, the phrase "organic pigment/pigment precursor" is used for convenience rather than repeating the same discussion for each of the organic pigment and the pigment precursor.

The functional moiety (denoted as FM) of the organic pigment/precursor can be any suitable moiety capable of non-covalent bonding with the complementary functional group of the stabilizer. Illustrative functional moieties of the organic pigment/precursor include (but are not limited to) the following: sulfonate/sulfonic acid, (thio)carboxylate/(thio) carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

Pigment precursors for making monoazo laked nanopigments consist of a substituted aniline precursor (denoted as "DC" in Table 1) which forms the diazo group $G_d$ of Formula (1), a nucleophilic or basic coupling compound (denoted as "CC" in Tables 2-6) which leads to the coupling group $G_c$ of Formula (1), and a cation salt which is preferably a metal (denoted as "M" as shown in Formula (1)). Representative examples of the aniline precursor of laked monoazo pigments that have the functional moiety capable of non-covalent bonding with a complementary functional group on the stabilizer, include (but are not limited to) the following structures (with the functional moiety "FM" denoted, if applicable).

In an embodiment, the substituted aniline precursor (DC) which leads to the diazonium group can be of the formula (2):

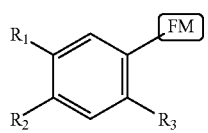

Formula (2)

where $R_1$, $R_2$, and $R_3$ independently represent H, a straight or branched alkyl group of from about 1 to about 10 carbon atoms (such as methyl, ethyl, propyl, butyl, and the like), halogen (such as Cl, Br, I), $NH_2$, $NO_2$, $CO_2H$, $CH_2CH_3$, and the like; and functional moiety FM represents $SO_3H$, $-C(=O)-NH$-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, $-C(=O)-NH_2$, and the like. The substituted aniline precursor (DC) can be also be Tobias Acid, of the formula (3):

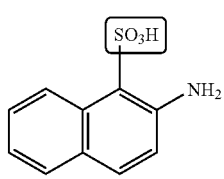

Formula (3)

Specific examples of types of aniline precursors (DC) that are used to make the diazo group $G_d$ in the monoazo laked pigments include those of Table 1:

TABLE 1

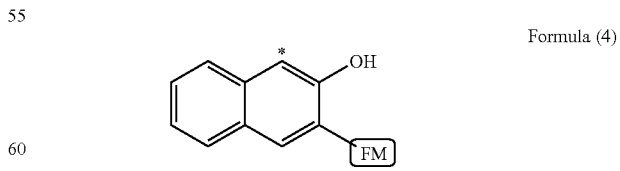

| Precursor to Group $G_d$ | Functional Moiety FM | $R_1$ | $R_2$ | $R_3$ |
|---|---|---|---|---|
| DC1 | $SO_3H$ | $CH_3$ | H | $NH_2$ |
| DC2 | $SO_3H$ | $CH_3$ | Cl | $NH_2$ |
| DC3 | $SO_3H$ | Cl | $CH_3$ | $NH_2$ |
| DC4 | $SO_3H$ | Cl | $CO_2H$ | $NH_2$ |
| DC5 | $SO_3H$ | Cl | $CH_2CH_3$ | $NH_2$ |
| DC6 | $SO_3H$ | Cl | Cl | $NH_2$ |
| DC7 | $SO_3H$ | H | $NH_2$ | H |
| DC8 | $SO_3H$ | H | $NH_2$ | $CH_3$ |
| DC9 | $SO_3H$ | $NH_2$ | H | Cl |
| DC10 | $SO_3H$ | H | H | $NH_2$ |
| DC11 | $SO_3H$ | H | $NH_2$ | H |
| DC12 | $SO_3H$ | $NO_2$ | $NH_2$ | H |
| DC13 | $-\overset{O}{\underset{}{C}}-\underset{H}{N}-\text{\textlangle}\text{\textrangle}-SO_3^\ominus$ | $NH_2$ | $CH_3$ | H |
| DC14 | $CO_2H$ | H | H | $NH_2$ |
| DC15 | Cl | H | H | $NH_2$ |
| DC16 | $NH_2$ | $CH_3$ | H | H |
| DC17 | $NH_2$ | H | $CH_3$ | H |
| DC18 | $-\overset{O}{\underset{}{C}}-NH_2$ | $NH_2$ | $CH_3$ | H |
| DC19 | $-\overset{O}{\underset{}{C}}-NH_2$ | H | $NH_2$ | H |
| DC20 | $NH_2$ | H | H | H |
| DC21 | "Tobias Acid" | | | |

In an embodiment, the coupling group $G_c$ of Formula (1) can include β-naphthol and derivatives of Formula (4), naphthalene sulfonic acid derivatives of Formulas (5) and (6), pyrazolone derivatives of Formula (7), acetoacetic arylide derivatives of Formula (8), and the like. In formulas (4)-(8), the asterisk "*" denotes the point of coupling or attachment to the monoazo (N=N) linkage.

Formula (4)

where FM represents H, $CO_2H$, $SO_3H$, $-C(=O)-NH$-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, $—C(=O)—NH_2$, substituted benzamides such as:

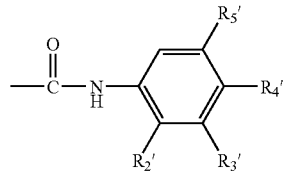

wherein groups $R_2'$ $R_3'$, $R_4'$ and $R_5'$ can independently be H, alkyl groups having from about 1 to 10 carbons (such as methyl, ethyl, propyl, butyl, and the like), alkoxyl groups (such as $OCH_3$, $OCH_2CH_3$, and the like), hydroxyl or halogen (such as Cl, Br, I, F) or nitro $NO_2$; or benzimidazolone amides such as:

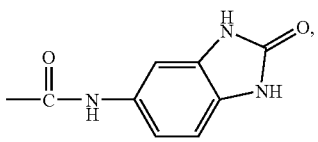

and the like.

Formula (5)

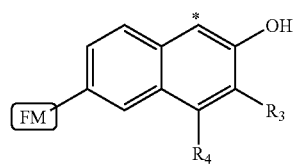

where FM represents preferably $SO_3H$, but also can represent $CO_2H$, $—C(=O)—NH-Aryl-SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, $—C(=O)—NH_2$ groups $R_3$ and $R_4$ independently represent H, $SO_3H$, and the like.

Formula (6)

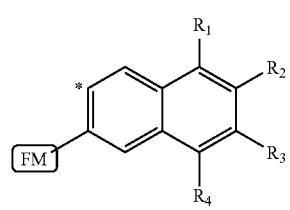

where FM represents preferably $SO_3H$, but also can represent $CO_2H$, $—C(=O)—NH-Aryl-SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, $—C(=O)—NH_2$; $R_1$, $R_2$, $R_3$ and $R_4$ independently represent H, $SO_3H$, $—C(=O)—NH$-Phenyl, and the like.

Formula (7)

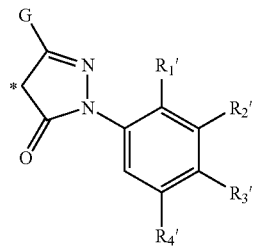

where G represents $CO_2H$, straight or branched alkyl such as having from 1 to about 10 carbons atoms (such as methyl, ethyl, propyl, butyl, or the like), and the like; and $R_1'$, $R_2'$, $R_3'$ and $R_4'$ independently represent H, halogen (such as Cl, Br, I), $SO_3H$, nitro ($NO_2$) or alkoxyl group such as $OCH_3$ or $OCH_2CH_3$ and the like.

Formula (8)

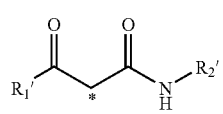

where $R_1'$ represents a straight or branched alkyl group having, for example, from 1 to about 10 carbon atoms (such as methyl, ethyl, propyl, butyl, and the like); $R_2'$ represents a benzimidazolone group:

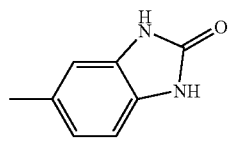

or a substituted aryl group

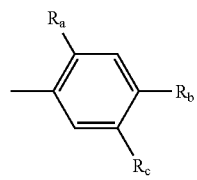

where each of $R_a$, $R_b$, and $R_c$ independently represents H, a straight or branched alkyl group having, for example, from 1 to about 10 carbon atoms (such as methyl, ethyl, propyl, butyl, and the like), alkoxyl groups such as $OCH_3$ or $OCH_2CH_3$ and the like, halogen (such as Cl, Br, I), nitro $NO_2$, and the like.

Representative examples of the nucleophilic coupling component as a precursor of laked monoazo pigments which have the functional moiety that is capable of non-covalent bonding with a complementary functional group on the stabilizer, include (but are not limited to) the following structures shown in Tables 2-6 (with the functional moiety "FM" denoted, if applicable):

TABLE 2

[Structure: naphthalene with OH and FM groups; * = point of coupling to diazo component]

| Precursor to group $G_c$ | Class of Coupling Component | Functional Moiety FM |
|---|---|---|
| CC1 | β-Naphthol | H |
| CC2 | β-oxynaphthoic acid ("BONA") | $CO_2H$ |
| CC3 | Naphthol AS derivatives | —C(=O)—NH—[phenyl with $R_2'$, $R_4'$] |
| CC6 | Benzimidazolone | —C(=O)—NH—[benzimidazolone] |

TABLE 3

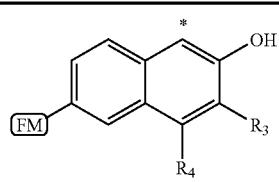

* = point of coupling to diazo component

| Precursor to group $G_c$ | Class of Coupling Component | FM | $R_3$ | $R_4$ |
|---|---|---|---|---|
| CC4a | Naphthalene Sulfonic Acid derivatives | $SO_3H$ | H | H |
| CC4b | Naphthalene Sulfonic Acid derivatives | $SO_3H$ | $SO_3H$ | H |

TABLE 4

[Structure: naphthalene with FM, $R_1$, $R_2$, $R_3$, $R_4$; * = point of coupling to diazo component]

| Precursor to group $G_c$ | Class of Coupling Component | FM | $R_1$ | $R_2$ | $R_3$ | $R_4$ |
|---|---|---|---|---|---|---|
| CC5 | Naphthalene Sulfonic Acid derivatives | $SO_3H$ | —C(=O)—NH—Ph | H | H | $SO_3H$ |

TABLE 5

[Structure: pyrazolone with G, $R_1'$, $R_2'$, $R_3'$, $R_4'$; * = point of coupling to diazo component]

| Precursor to group $G_c$ | Class of Coupling Component | G | $R_1'$ | $R_2'$ | $R_3'$ | $R_4'$ |
|---|---|---|---|---|---|---|
| CC7 | Pyrazolone deriv. | $CO_2H$ | H | H | $SO_3H$ | H |
| CC8 | Pyrazolone deriv. | $CH_3$ | H | H | $SO_3H$ | H |
| CC9 | Pyrazolone deriv. | $CH_3$ | H | $SO_3H$ | H | H |
| CC10 | Pyrazolone deriv. | $CH_3$ | Cl | H | $SO_3H$ | Cl |

TABLE 6

[Structure: $R_1'$—C(=O)—CH(*)—C(=O)—NH—$R_2'$; * = point of coupling to diazo component]

| Precursor to group $G_c$ | Class of Coupling Component | $R_1'$ | $R_2'$ | $R_a$ | $R_b$ | $R_c$ |
|---|---|---|---|---|---|---|
| CC11 | Acetoacetic arylide | $CH_3$ | [phenyl with $R_a$, $R_b$, $R_c$] | H | H | H |

TABLE 6-continued

[Structure: R$_1$'-C(=O)-CH$_2$*-C(=O)-NH-R$_2$']

\* = point of coupling to diazo component

| Precursor to group G$_c$ | Class of Coupling Component | R$_1$' | R$_2$' | R$_a$ | R$_b$ | R$_c$ |
|---|---|---|---|---|---|---|
| CC12 | Acetoacetic arylide | CH$_3$ | [phenyl with R$_a$, R$_b$, R$_c$ substituents] | CH$_3$ | H | H |
| CC13 | Acetoacetic arylide | CH$_3$ | [phenyl with R$_a$, R$_b$, R$_c$ substituents] | Cl | H | H |
| CC14 | Acetoacetic arylide | CH$_3$ | [phenyl with R$_a$, R$_b$, R$_c$ substituents] | H | OCH$_3$ | H |
| CC15 | Acetoacetic benzimidazolone | CH$_3$ | [benzimidazolone] | — | — | — |

The organic pigment, and in some embodiments, the organic pigment precursor, also generally includes a counterion as part of the overall structure. Such counterions can be, for example, any suitable counterion including those that are well known in the art. Such counterions can be, for example, cations or anions of either metals or non-metals that include N, P, S and the like, or carbon-based cations or anions. Examples of suitable cations include ions of Ba, Ca, Cu, Mg, Sr, Li, Na, K, Cs, Mn, Cu, Cr, Fe, Ti, Ni, Co, Zn, V, B, Al, Ga, and other metal ions, as well as ammonium and phosphonium cations, mono-, di-, tri-, and tetra-substituted ammonium and phosphonium cations, where the substitutents can be aliphatic alkyl groups, such as methyl, ethyl, butyl, stearyl and the like, as well as aryl groups such as phenyl or benzyl and the like.

Representative examples of monoazo laked pigments comprised from a selection of substituted aniline precursors (denoted DC) which can also include Tobias Acid, nucleophilic coupling component (denoted as CC) and metal salts (denoted as M) to provide the counter-cation M$^{n+}$ of formula (1) are listed in Table 7, and other laked pigment structures may arise from other combinations of DC and CC and metal cation salt (M) that are not shown in Table 7.

TABLE 7

$$\left[ G_d-N=N-G_c \right] \cdot M$$

| Color Index # (C.I.) | Color Index (C.I.) Name | Laked Pigment Class | G$_d$ precursor | G$_c$ precursor | Metal Salt M |
|---|---|---|---|---|---|
| 15500:1 | Red 50:1 | β-Naphthol Lakes | DC14 | CC1 | ½ Ba |
| 15510:1 | Orange 17 | β-Naphthol Lakes | DC7 | CC1 | Ba |

TABLE 7-continued

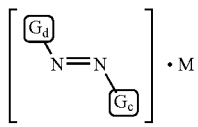

| Color Index # (C.I.) | Color Index (C.I.) Name | Laked Pigment Class | $G_d$ precursor | $G_e$ precursor | Metal Salt M |
|---|---|---|---|---|---|
| 15510:2 | Orange 17:1 | β-Naphthol Lakes | DC7 | CC1 | ⅔ Al |
| 15525 | Red 68 | β-Naphthol Lakes | DC4 | CC1 | 2 Ca |
| 15580 | Red 51 | β-Naphthol Lakes | DC8 | CC1 | Ba |
| 15585 | Red 53 | β-Naphthol Lakes | DC3 | CC1 | 2 Na |
| 15585:1 | Red 53:1 | β-Naphthol Lakes | DC3 | CC1 | Ba |
| 15585:3 | Red 53:3 | β-Naphthol Lakes | DC3 | CC1 | Sr |
| 15602 | Orange 46 | β-Naphthol Lakes | DC5 | CC1 | Ba |
| 15630 | Red 49 | β-Naphthol Lakes | DC21 | CC1 | 2 Na |
| 15630:1 | Red 49:1 | β-Naphthol Lakes | DC21 | CC1 | Ba |
| 15630:2 | Red 49:2 | β-Naphthol Lakes | DC21 | CC1 | Ca |
| 15630:3 | Red 49:3 | β-Naphthol Lakes | DC21 | CC1 | Sr |
| 15800 | Red 64 | β-oxynaphthoic acid (BONA) Lakes | DC20 | CC2 | ½ Ba |
| 15800:1 | Red 64:1 | β-oxynaphthoic acid (BONA) Lakes | DC20 | CC2 | ½ Ca |
| 15800:2 | Brown 5 | β-oxynaphthoic acid (BONA) Lakes | DC20 | CC2 | ½ Cu |
| 15825:2 | Red 58:2 | β-oxynaphthoic acid (BONA) Lakes | DC9 | CC2 | Ca |
| 15825:4 | Red 58:4 | β-oxynaphthoic acid (BONA) Lakes | DC9 | CC2 | Mn |
| 15850:1 | Red 57:1 | β-oxynaphthoic acid (BONA) Lakes | DC1 | CC2 | Ca |
| 15860:1 | Red 52:1 | β-oxynaphthoic acid (BONA) Lakes | DC3 | CC2 | Ca |
| 15860:2 | Red 52:2 | β-oxynaphthoic acid (BONA) Lakes | DC3 | CC2 | Mn |
| 15865:1 | Red 48:1 | β-oxynaphthoic acid (BONA) Lakes | DC2 | CC2 | Ba |
| 15865:2 | Red 48:2 | β-oxynaphthoic acid (BONA) Lakes | DC2 | CC2 | Ca |
| 15865:3 | Red 48:3 | β-oxynaphthoic acid (BONA) Lakes | DC2 | CC2 | Sr |
| 15865:4 | Red 48:4 | β-oxynaphthoic acid (BONA) Lakes | DC2 | CC2 | Mn |
| 15865:5 | Red 48:5 | β-oxynaphthoic acid (BONA) Lakes | DC2 | CC2 | Mg |
| 15867 | Red 200 | β-oxynaphthoic acid (BONA) Lakes | DC5 | CC2 | Ca |
| 15880:1 | Red 63:1 | β-oxynaphthoic acid (BONA) Lakes | DC21 | CC2 | Ca |
| 15880:2 | Red 63:2 | β-oxynaphthoic acid (BONA) Lakes | DC21 | CC2 | Mn |
| 15892 | Red 151 | Naphthol AS Lakes | DC10 | CC3 ($R_2'$ = H, $R_4'$ = $SO_3H$) | Ba |
| 15910 | Red 243 | Naphthol AS Lakes | DC2 | CC3 ($R_2'$ = $OCH_3$, $R_4'$ = H) | ½ Ba |
| 15915 | Red 247 | Naphthol AS Lakes | DC13 | CC3 ($R_2'$ = H, $R_4'$ = $OCH_3$) | Ca |
| 15985:1 | Yellow 104 | Naphthalene Sulfonic Acid Lakes | DC7 | CC4a | ⅔ Al |
| 15990 | Orange 19 | Naphthalene Sulfonic Acid Lakes | DC15 | CC4a | ½ Ba |
| 16105 | Red 60 | Naphthalene Sulfonic Acid Lakes | DC14 | CC4b | ½ Ba |
| 18000:1 | Red 66 | Naphthalene Sulfonic Acid Lakes | DC16 | CC5 | ½ Ba, Na |

The complementary functional group of the stabilizer can be one or more of any suitable moiety capable of non-covalent bonding with the functional moiety of the stabilizer. Illustrative complementary functional groups on the stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

The stabilizer can be any compound that has the function of limiting the extent of pigment particle or molecular self-assembly so as to produce predominantly nanoscale-sized pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional spatial volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity pigment or precursor), the stabilizer molecules act as surface barrier agents for the primary pigment particles and effectively encapsulates them, and thereby limits the growth of the pigment particles and affording only nanoparticles of the pigment. For example, for the pigment precursor Lithol Rubine and for the organic pigment Pigment Red 57:1, the following illustrative groups on a stabilizer are considered to have adequate "steric bulk" so as to enable the stabilizer to limit the extent of pigment self-assembly or aggregation and mainly produce pigment nano-sized particles:

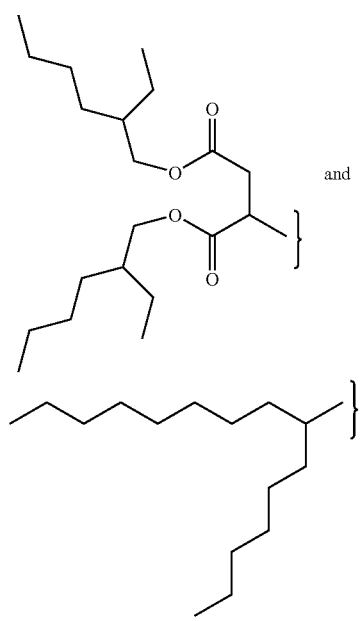

Representative examples of stabilizer compounds that have both the functional group that non-covalently associates with the pigment and the sterically bulky hydrocarbon moiety, include (but are not limited to) the following compounds:

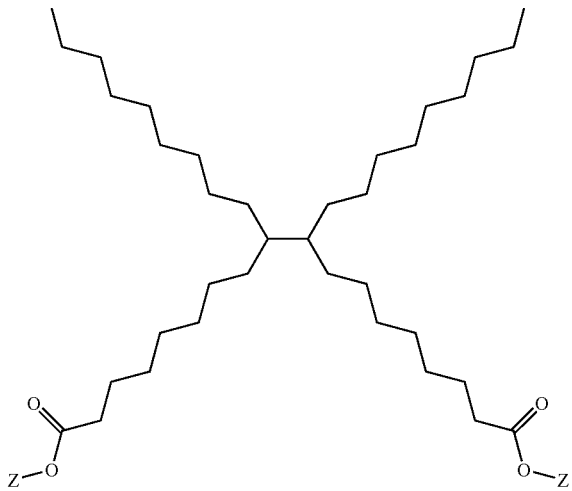

C36 Dimmer Diacid

-continued

Z = H; Metal cations such as Na, K, Li, Ca, Ba, Sr, Mg, Mn, Al, Cu, B, and others; Organic cations such as $NH_4^+$, $PR_4^+$, and others

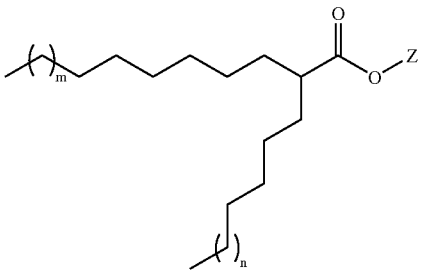

Z = H; Metal cations such as Na, K, Li, Ca, Ba, Sr, Mg, Mn, Al, Cu, B, and others; Organic cations such as $NH_4^+$, $NR_4^+$, $PR_4^+$, and others: and methylene units (m + n) > 1

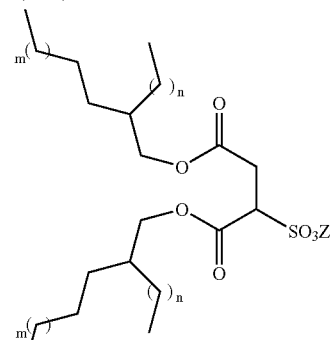

Z = H; Metal cations such as Na, K, Li, Ca, Ba, Sr, Mg, Mn, Al, Cu, B, and others; Organic cations such as $NH_4^+$, $NR_4^+$, $PR_4^+$, and others; and methylene units (m + n) > 1 per branch wherein m and n denotes the number of repeated methylene units, and where m can range between 1 and 50, and n can range between 1 and 5, however the values can also be outside these ranges.

In additional embodiments, other stabilizer compounds having different structures than those described previously may be used in addition to sterically bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such hydrocarbon alcohols, acrylic-based polymers such as poly(acrylic acid), poly(methyl methacrylate), styrene-based copolymers such as poly(styrene sodio-sulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The types of non-covalent chemical bonding that can occur between the functional moiety of the precursor/pigment and the complementary functional group of the stabilizer are, for example, van der Waals' forces, ionic or coordination bonding, hydrogen bonding, and/or aromatic pi-stacking bonding. In embodiments, the non-covalent bonding is predominately ionic bonding, but can include hydrogen bonding and aromatic pi-stacking bonding as additional or alternative types of non-covalent bonding between the functional moieties of the stabilizer compounds and the precursor/pigment.

The "average" pigment particle size, which is typically represented by Z-average, which is defined as an intensity mean which is derived from the cumulants analysis of an intensity signal obtained from dynamic light scattering method, and also by $d_{50}$, which is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be measured by methods that use light scattering technology to infer particle size, such as by dynamic light scattering (DLS). The term "particle diameter" as used herein refers to the length of the pigment particle at the longest dimension (in the case of acicular shaped particles) as derived from images of the particles generated by Transmission Electron Microscopy (TEM). The term "nano-sized", "nanoscale", "nanoscopic", or "nano-sized pigment particles" refers to for instance, an average particle size, $d_{50}$, or Z-average, or an average particle diameter of less than about 150 nm, such as of about 1 nm to about 100 nm, or about 10 nm to about 80 nm. Typically, the distribution of a population of particle sizes is expressed by a width parameter or the polydispersity index (PDI), such as can be derived by DLS technique, and also by geometric standard deviation (GSD) which is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n} (\ln A_i - \ln \mu_g)^2}{n}}$$

The method of making nano-sized particles of the monoazo laked pigments such as those listed in Table 7 is a process that involves at least one or more reaction steps. A diazotization reaction is a key reaction step for synthesis of the monoazo laked pigment, whereby a suitably substituted aniline precursor (denoted as diazo component DC) such as those listed in Table 1, and Formulas (2) and (3), is either directly or indirectly converted first to a diazonium salt using standard procedures, such as that which includes treatment with an effective diazotizing agent such as nitrous acid $HNO_2$ (which is generated in situ by mixing sodium nitrite with dilute protic acid solution such as hydrochloric acid), or nitrosyl sulfuric acid (NSA), which is commercially available or can be prepared by mixing sodium nitrite in concentrated sulfuric acid. Initially, it may be necessary to first dissolve the precursor substituted aniline in alkaline solution (such as aqueous potassium hydroxide solution, or ammonia water) followed by treatment with the diazotizing agent and acid solution, so as to generate the diazonium salt. The diazotization procedure is typically carried out at cold temperatures so as to keep the diazonium salt stable, and the resulting reaction mixture will comprise mainly the diazonium salt either dissolved or suspended as a precipitate in acidic medium. If desired and effective, an aqueous solution of the metal salt ($M^{n+}$) can be optionally added that will define the specific composition of the desired monoazo laked pigment product, such as those listed in Table 7. A second solution or suspension is prepared by dissolving or suspending the nucleophilic coupling component (denoted as CC, such as those shown in Tables 2-6, and Formulas (4)-(8)) mainly into water, which may optionally contain another liquid such as an organic solvent (for example, iso-propanol, tetrahydrofuran, methanol, or other), and either acids or bases to render the coupling component into solution or a fine suspension and aid reaction with the diazonium salt solution, and additionally any buffers or surface active agents including the sterically bulky stabilizer compounds such as those described previously.

The reaction mixture containing the dissolved or suspended diazonium salt is then transferred into the solution or suspension of the desired nucleophilic coupling component, and the temperature of the mixture can range from about 10° C. to about 75° C., in order to produce a solid colorant material suspended as a precipitate in an aqueous slurry.

The solid colorant material may be the desired monoazo laked pigment product formed as nano-sized particles, or it may be an advanced synthetic intermediate for making the monoazo laked pigment product. In the case of the latter, a two-step process is required for preparing the nano-sized particles of monoazo laked pigment, whereby the second step involves rendering the advanced synthetic intermediate of the first step above (the pigment precursor) into homogeneous liquid solution by treatment with either strong acid or alkaline base, then treating this solution with one or more surface active agents in addition to the sterically bulky stabilizer compounds, as described previously, followed lastly by treatment with the required metal salt solution to provide the desired laked monoazopigment composition as a solid precipitate, said metal salt solution effectively functioning as a pigment precipitating agent. There are several chemical as well as physical processing factors can affect the final particle size and distribution of the monoazo laked pigment nanoparticles, including stoichiometries of the DC and CC starting reactants, metal salt, surface active agents, and stabilizer compounds, the concentrations of chemical species in the liquid medium, pH of liquid medium, temperature, addition rate, order of addition, agitation rate, post-reaction treatments such as heating, isolation and washing of particles, and drying conditions.

In embodiments is disclosed a two-step method of making nano-sized monoazo laked red pigments, for example Pigment Red 57:1, wherein the advanced pigment precursor Lithol Rubine is first synthesized as a potassium salt and is a water-soluble orange dye. The first step involves the diazotization of 2-amino-5-methyl-benzenesulfonic acid (DC1 in Table 1) by first dissolving the DC in dilute aqueous potassium hydroxide solution (0.5 mol/L) and cooling to a temperature anywhere in the range of about −5° C. to about 5° C., and then treating the solution with an aqueous solution of sodium nitrite (20 wt %), following with slow addition of concentrated hydrochloric acid at a rate that maintains the internal reaction temperature between −5° C. and +5° C. The resulting suspension that forms is stirred for additional time so as to ensure completeness of diazotization, and then the suspension is carefully transferred to a second solution containing 3-hydroxy-2-naphthoic acid dissolved in dilute alkaline solution (0.5 mol/L potassium hydroxide), using vigorous agitation as the colorant product is produced in the aqueous slurry. After stirring for additional time of at least 1 hour at room temperature, the colorant product (Lithol Rubine-potassium salt) is isolated by filtration as an orange dyestuff and washed with deionized water to remove excess salt by-products.

The second step of the process involves redispersing the orange Lithol Rubine-potassium salt dyestuff in deionized water to a concentration that can range from about 0.5 wt % to about 20 wt %, such as from about 1.5 wt % to about 10 wt % or from about 3.5 wt % to about 8 wt %, but the concentrations can also be outside of these ranges. The colorant solids in the slurry is then dissolved completely into liquid solution by treatment with aqueous alkaline base, such as sodium hydroxide or potassium hydroxide or ammonium hydroxide solution, until the pH level is high, such as above pH 8.0 or above pH 9.0 or above pH 10.0. To this alkaline solution of dissolved Lithol Rubine colorant can be optionally added a surface active agent as described previously, in particular embodiments surface active agent such as rosin soaps, delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges.

In embodiments, the preparation of ultrafine and nanosized particles of the monoazo laked Pigment Red 57:1 was only enabled by the additional use of a sterically bulky stabilizer compound having a functional group that could non-covalently bond to the complementary functional moiety of the pigment as well as branched aliphatic functional groups that could provide steric bulk to the pigment particle surface. In embodiments, particularly suitable sterically bulky stabilizer compounds are branched hydrocarbons with either carboxylate or sulfonate functional groups, compounds such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a water-miscible organic solvent such as THF, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant.

Lastly, the metal cation salt is added to transform the pigment precursor (Lithol Rubine-potassium salt in embodiments) into the desired monoazo laked pigment (Pigment Red 57:1 in embodiments), precipitated as nano-sized pigment particles. The aqueous solution of metal salt (calcium chloride in embodiments) with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess.

The type of metal salt can have an impact on the extent of forming nano-sized pigment particles of monoazo laked pigments, in particular the type of ligand that is coordinated to the metal cation and the relative ease with which it is displaced by a competing ligand from either the pigment functional moiety or the complementary functional moiety of the stabilizer compound, or both. In embodiments for monoazo laked Pigment Red 57:1, the nano-sized particles are formed using calcium (II) salts with ligands such as chloride, sulfate, acetate, and hydroxide; however a particularly desirable metal salt is calcium chloride for fastest reactivity.

The rates of addition of metal salt solution can also vary. For example, the slower the rate of addition, the more controlled is the rate of pigment crystal formation and particle aggregation, and therefore the smaller in size the pigment particles become.

Also important is the agitation rate and mixing pattern as the pigment formation/precipitation step is occurring. The higher the agitation rate and the more dynamic or complex is the mixing pattern (i.e. with baffles to prevent dead mixing zones), the smaller is the average particle diameter and the more narrow is the particle size distribution, as observable by Transmission Electron Microscopy (TEM) imaging. Agitation can be made more effective by using high-shear mixers such as homogenizers, attritors, our even the use of ultrasonic probes.

Temperature during the pigment precipitation step using the metal salt solution is also important. In embodiments, lower temperatures are desired, such as from about 10° C. to about 50° C., or from about 15° C. to about 30° C., but the temperature can also be outside of these ranges.

In embodiments, the slurry of pigment nanoparticles is not treated nor processed any further, such as performing additional heating which is often practiced by pigment manufacturers, but instead is isolated by vacuum filtration or centrifugal separation processes. The pigment solids can be washed copiously with deionized water to remove excess salts or additives that are not tightly associated or bonded with the pigment particle surface. The pigment solids can be dried by freeze-drying under high vacuum, or alternatively, they can be pre-rinsed with a water-miscible solvent such as isopropanol or acetonitrile to remove excess water and then vacuum-oven dried. The resulting nano-size pigment particles are generally non-aggregated and of high quality, which when imaged by TEM (Transmission Electron Microscopy), exhibit primary pigment particles and small aggregates ranging in diameters from about 10 nm to about 300 nm, and predominantly from about 50 nm to about 150 nm. (Here, it is noted that average particle size $d_{50}$ or Z-average, and GSD particle size distributions are measured by Dynamic Light Scattering, an optical measurement technique that estimates the hydrodynamic radius of non-spherical pigment particles gyrating and translating in a liquid dispersion via Brownian motion, by measuring the intensity of the incident light scattered from the moving particles. As such, the $d_{50}$ or the Z-average particle size metric obtained by DLS technique is always a larger number than the actual particle diameters observed by TEM imaging.)

Characterization of the chemical composition of washed and dried nano-sized pigment particles are performed by NMR spectroscopy and elemental analysis. In embodiments, the composition of the monoazo laked pigment Red 57:1 indicated that the nano-sized particles prepared by the methods described above, particularly when using di[2-ethylhexyl]-3-sulfosuccinate sodium as the sterically bulky stabilizer, retained at least 80% of the sterically bulky stabilizer that was loaded into the process of making the nanoparticles, even after copious washing with deionized water to remove excess salts. Solid state $^1$H— and $^{13}$C-NMR spectroscopic analyses indicated that the steric stabilizer compound was associated non-covalently with the pigment as a calcium salt, and the chemical structure of the pigment adopted the hydrazone tautomer form, as shown in Figure below.

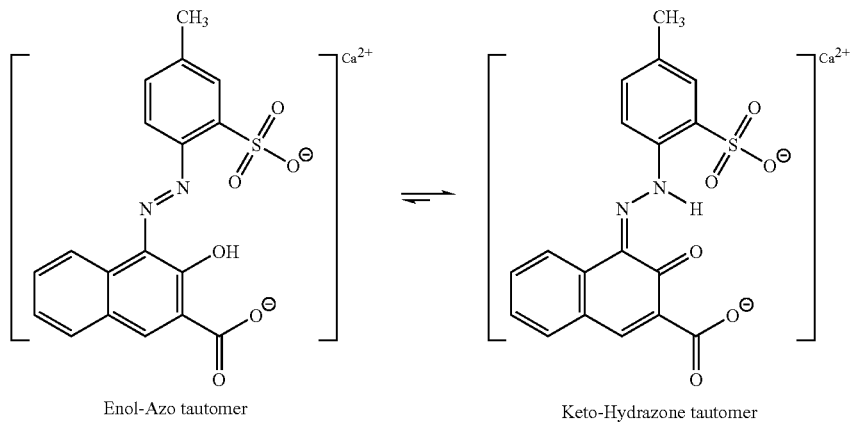

Enol-Azo tautomer          Keto-Hydrazone tautomer

Pigment particles of monoazo laked pigments such as PR 57:1 that have smaller particle sizes could also be prepared by the above two-step method in the absence of using sterically bulky stabilizers and with the use of surface active agents alone (for example, only rosin-type surface agents), depending on the concentrations and process conditions employed, but the pigment product did not predominantly exhibit nanosized particles nor did the particles exhibit regular morphologies. In the absence of using the sterically bulky stabilizer compound, the two-step method described above typically produced rod-like particle aggregates, ranging in average particle diameter from 200-700 nm and with wide particle distribution, and such particles were difficult to disperse into a polymer coating matrix and generally gave poor coloristic properties. In embodiments, the combined use of a suitable sterically bulky stabilizer compound, such as branched alkanesulfonates or alkylcarboxylates, with a minor amount of suitable surface active agent such as derivatives of rosin-type surfactants, using either of the synthesis methods described previously would afford the smallest fine pigment particles having nanometer-scale diameters, more narrow particle size distribution, and low aspect ratio. Various combinations of these compounds, in addition to variations with process parameters such as stoichiometry of reactants, concentration, addition rate, temperature, agitation rate, reaction time, and post-reaction product recovery processes, enables the formation of pigment particles with tunable average particle size ($d_{50}$ or Z-average) from nanoscale sizes (about 1 to about 100 nm) to mesoscale sizes (about 100 to about 500 nm) or larger.

The advantages of this process include the ability to tune particle size and composition for the intended end-use application of the monoazo laked pigment, such as for use in toners and inks and coatings, which for example include phase-change, gel-based and radiation-curable inks, solid and non-polar liquid inks, solvent-based inks and aqueous inks and ink dispersions. For the end-use application in piezoelectric inkjet printing, nano-sized particles are advantageous to ensure reliable inkjet printing and prevent blockage of jets due to pigment particle agglomeration. In addition, nano-sized pigment particles are advantageous for offering enhanced color properties in printed images, since in embodiments the color properties of nano-sized particles of monoazo laked pigment Red 57:1 were tunable with particle size. It was observed that as average particle size was decreased to the nanometer-scale, the hue angles were shifted from yellowish-red hues to bluish-red hues by an amount ranging from about 5 to about 35° in the color gamut space.

In embodiments, the nanosized pigment particles that were obtained for monoazo laked pigments can range in average particle size, $d_{50}$ or Z-average, or the average particle diameter, from about 10 nm to about 250 nm or about 500 nm, such as from about 25 nm to about 175 nm, or from about 50 nm to about 150 nm, as measured by either dynamic light scattering method or from TEM images. The pigment average particle size can accordingly be tuned by the above method, to provide compositions with desired average particle sizes. For example, within the broad suitable size range of about 1 nm to about 500 nm or larger, the pigment composition can be provided to have an average particle size that is generally in the nanoscale size range (about 1 to about 100 nm) or generally in the mesoscale size range (about 100 to about 500 nm) or larger. In embodiments, the pigment composition can be provided to have an average particle size in the ranges of from about 10 nm to about 50 nm, about 50 nm to about 100 nm, about 100 nm to about 150 nm, or about 150 nm to about 300 nm. For example, in embodiments, the pigment composition can be provided to have an average particle size of about 50 nm to about 12550 nm. In embodiments, the particle size distributions can range such that the geometric standard deviation can range from about 1.1 to about 1.9, or from about 1.2 to about 1.7, as measured by dynamic light scattering method. The shape of the nanosized pigment particles can be one or more of several morphologies, including rods, platelets, needles, prisms or nearly spherical, and the aspect ratio of the nanosize pigment particles can range from about 1:1 to about 10:1, such as having aspect ratio between about 1:1 and about 5:1; however the actual metric can lie outside of these ranges.

In addition, nanosized pigment particles are advantageous for offering enhanced color properties in printed images, since in embodiments the color properties of nanosized particles of monoazo laked pigment Red 57:1 were tunable with particle size. In embodiments is disclosed the coloristic properties (hue angle, a*, b*, and NLSI as measure of specular reflectivity) of nanosized pigment particles, particularly of monoazo laked red pigment, that are directly correlated and tunable with the average pigment particle size, measured by either Dynamic Light Scattering or electron microscopy imaging techniques, as well as pigment composition with the non-covalently associated stabilizer, the latter which enables the control of particle size during pigment synthesis, and also enables enhanced dispersability within certain polymer binders for coating or other applications. For example, as average particle size was decreased to nanometer-scale, the hue angles were shifted from yellowish-red hues to bluish-red hues by an amount ranging from about 5 to about 35° in the color gamut space. The color of the nanosized pigment particles have the same general hue as is found with larger pigment particles. However, in embodiments, is disclosed coloristic properties of thin coatings of the nano-sized pigment particles of red monoazo laked pigments dispersed in a polymer binder (such as of poly(vinyl butyral-co-vinyl alcohol-co-vinyl acetate)), that exhibited a significant shift to lower hue angle and lower b* values that revealed more bluish magenta hues, and having either no change or a small enhancement of a* value. In embodiments, any suitable polymer can be used to effect both good pigment dispersion and to act as a pigment binder to allow a good film forming quality about the substrate. In other embodiments, it is advantageous when assessing coloristic properties of pigments, as they are dispersed in coatings, for example, that the polymer used to disperse a pigment is transparent to visible light, either chemically or by way of not scattering light owing to the polymer being more amorphous than crystalline, not be prone to fluorescence, and does not discolor during a dispersion making process or during the drying process after it has been coated on a substrate.

In embodiments, the hue angles of the coatings dispersed with the nanosized particles of monoazo laked pigment such as Pigment Red 57:1 measured in the range from about 345° to about 5° on the 2-dimensional b* a* color gamut space, as compared with hue angles ranging from about 0° to about 20° for similarly prepared polymer coatings dispersed with conventional larger sized particles of Pigment Red 57:1. The coatings dispersed with the nanosized particles of monoazo laked pigment can accordingly exhibit hue angles of from about 345° to about 5°, such as from about 345° to about 0°, or from about 345° to about 350° or to about 355°, on the 2-dimensional b* a* color gamut space.

Additionally, the specular reflectivity of the coatings of the nanosized monoazo laked red pigment was significantly enhanced from coatings produced with conventional larger sized pigment particles, which is an indicator of having very small particles being well-dispersed within the coating. Specular reflectivity was quantified as the degree of light scattering for the pigmented coating, a property that is dependent on the size and shape distributions of the pigment particles and their relative dispersability within the coating binder. The Normalized Light Scatter Index (NLSI) was quantified by measuring the spectral absorbance of the coating, using a Shimadzu UV-160 spectrophotometer, in a region where there is no absorbance from the chromogen of the monoazo laked pigment, but only absorbance due to light scattered from large aggregates and/or agglomerated pigment particles dispersed in the coating binder. The light scattering absorbance data is then normalized to a lambda-max optical density of 1.5, resulting in the NLSI value, in order to directly compare the light scattering indices of several pigmented coatings. The lower is the NLSI value, the smaller is the pigment particle size within the dispersed coating matrix. In embodiments, the NLSI value of the nanosized monoazo laked red pigments can range from about 0.1 to about 3.0, such as from about 0.1 to about 1.0. In comparison, the NLSI values observed with similarly prepared coatings containing conventional larger sized monoazo laked red pigments range anywhere from about 3.0 to about 75 (which indicates a very poorly dispersed coating).

The formed nanoscale pigment particle compositions can be used, for example, as coloring agents in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including "low energy" solid inks with melt temperatures of about 60 to about 130° C., and solvent-based liquid inks or radiation-curable such as UV-curable liquid inks comprised of alkyloxylated monomers, and even aqueous inks.

In addition to ink compositions, the nanoscale-sized pigment composition can be used in a variety of other applications, where it is desired to provide a specific color to the composition. For example, the nanoscale-sized pigment composition can also be used in the same manner as conventional pigments in such uses as colorants for paints, resins, lenses, filters, printing inks, and the like according to applications thereof. By way of example only, the nanoscale-sized pigment composition of embodiments can be used for toner compositions, which include polymer particles and nanoscale pigment particles, along with other optional additives, that are formed into toner particles and optionally treated with internal or external additives such as flow aids, charge control agents, charge-enhancing agents, filler particles, radiation-curable agents or particles, surface release agents, and the like.

An example is set forth herein below and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Examples of Monoazo Laked Red Pigment Compositions and Methods of Making in Various Particle Sizes:

Comparative Example 1

Synthesis of Pigment Red 57:1 particles using a two-step method

Step 1: Diazotization and Couing: Into a 500 mL round bottom flask equipped with a mechanical stirrer, thermometer, and addition funnel was dissolved 2-amino-5-methyl-benzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed initially to a dark red solution, and ultimately to a yellowish-red (orange) slurry of precipitated dyestuff. The mixture was stirred for 2 hours while warming up to room temp, then filtered and diluted with about 500 mL of deionized water to produce an orange aqueous slurry of Lithol Rubine-Potassium salt dye (a synthetic precursor of Pigment Red 57:1) having solids content of about 1.6 wt %.

Step 2: Laking Step to Produce Pigment Red 57:1 Particles

Into a 500 mL round bottom flask equipped with mechanical stirrer and condenser was charged 126 g of aqueous slurry of Lithol Rubine-Potassium salt dye precursor from above having about 1.6% wt solids content. The pH of the slurry was adjusted to at least 9.0 or higher by addition of 0.5 M KOH solution, after which the dyestuff was fully dissolved. An aqueous solution of calcium chloride dihydrate (0.5 M solution, 13 mL) was added dropwise to the slurry while stirring vigorously. A red precipitate formed immediately, and after addition was completed, the slurry was stirred for an additional 1 hour. The red slurry was then heated to about 75° C. for 20 min, then cooled to room temp. The slurry was filtered under high vacuum through a 1.2 μm acrylic polymer membrane, then reslurried twice with 200 mL portions of deionized water. The pH and conductivity of the filtrates after each filtration were measured and recorded, with the final wash filtrate having nearly neutral pH of 6.2 and conductivity of about 13.5 μS/cm, indicating low residual salts. The red pigment filtercake was reslurried into about 200 mL of DIW and freeze-dried for 48 hours, to afford a red colored powder (1.95 grams). TEM microscopy revealed long rod-like particles and aggregates, with particle diameters ranging from about 200 nm to about 700 nm, and large aspect ratios ranging from about 4:1 to about 10:1.

Example 1

Synthesis of Nano-Sized Particles of Pigment Red 57:1 by a Two-Step Method

Step 1: Diazotization and Coupling: Into a 500 mL round bottom flask equipped with a mechanical stirrer, thermometer, and addition funnel was dissolved 2-amino-5-methyl-benzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed immediately to a dark red solution, and ultimately to a yellowish-red (orange) slurry of precipitated dyestuff. The mixture was stirred for 2 hours while warming up to room temp, then filtered and reslurried with about 500 mL of deionized water to produce an orange aqueous slurry of Lithol Rubine-Potassium salt dye having solids content of about 1.6 wt %.

Step 2: Laking Step to Produce Pigment Red 57:1 Particles:
Into a 500 mL round bottom flask equipped with mechanical stirrer and condenser was charged 126 g of aqueous slurry of Lithol Rubine-Potassium salt dye from above (Example 1, Step 1) having about 1.6% wt solids content. The pH of the slurry was adjusted to at least 9.0 or higher by addition of 0.5 M KOH solution, after which the dyestuff was fully dissolved. An aqueous solution 5 wt % Dresinate X (4.0 mL) was added, followed by a solution containing sodium dioctyl sulfosuccinate (0.96 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 μm Nylon membrane cloth, then reslurried twice with 75 mL portions of DIW. The pH and conductivity of the final wash filtrate was 7.4 and about 110 μS/cm, respectively, indicating that residual acids and salt by-products were removed. The red pigment filtercake was reslurried in about 250 mL of DIW and freeze-dried for 48 hours to afford a dark red colored powder (2.65 grams). Transmission electron microscopy images of the powder revealed platelet-like particles with particle diameters ranging from 30-150 nm, and aspect ratios that were less than 3:1. $^1$H-NMR spectroscopy analysis (300 MHz, DMSO-$d_6$) of the pigment indicated that the pigment adopted the hydrazone tautomer form, and that the dioctyl sulfosuccinate stabilizer compound was present at approximately 40 mol % (representing about 80% remaining of actual loading) and was associated with a calcium cation (determined by ICP spectroscopy).

Example 2

Synthesis of Nano-Sized Particles of Pigment Red 57:1 by a Two-Step Method

The procedure of Step 1 of Example 1 above was reproduced. Step 2: Laking
Into a 500 mL round bottom flask equipped with mechanical stirrer and condenser was charged 126 g of aqueous slurry of Lithol Rubine-Potassium salt dye from above (Example 1) having about 1.6% wt solids content. The pH of the slurry was adjusted to at least 9.0 or higher by addition of 0.5 M KOH solution, after which the dyestuff was fully dissolved. An aqueous solution 5 wt % Dresinate X (4.0 mL) was added, followed by a solution containing sodium dioctyl sulfosuccinate (0.96 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 μm Nylon membrane cloth, then reslurried twice with 75 mL portions of DIW. The pH and conductivity of the final wash filtrate was 7.15 and about 155 ES/cm, respectively. The red pigment filtercake was reslurried in about 250 mL of DIW and freeze-dried for 48 hours to afford a dark red-colored powder (2.62 grams). Transmission electron microscopy images of the powder revealed platelet-like particles with particle diameters ranging from 50-175 nm, and aspect ratios equal to or less than 3:1

Example 3

Synthesis of Nano-Sized Particles of Pigment Red 57:1 by a Two-Step Method

Step 1: Diazotization and Coupling: Into a 500 mL round bottom flask equipped with a mechanical stirrer, thermometer, and addition funnel was dissolved 2-amino-5-methyl-benzenesulfonic acid (12.15 g) into 0.5M KOH aqueous solution (135 mL). The resulting brown solution was cooled to 0° C. A 20 wt % aqueous solution of sodium nitrite ($NaNO_2$; 4.52 g dissolved into 30 mL water) was added slowly to the first solution while maintaining the temperature below −2° C. Concentrated HCl (10M, 19.5 mL) was then slowly added dropwise over 1 hour while maintaining the internal temperature below 0° C. The mixture formed a pale brown suspension and following complete addition of conc. HCl, the suspension was stirred an additional 30 min.

In a separate 2-L resin kettle was dissolved 3-hydroxy-2-naphthoic acid (12.2 g) into an aqueous solution of KOH (12.0 g) in water (130 mL). An additional 370 mL of water was added, and the pale brown solution was then cooled to about 15° C. while stirring. The cold suspension of the diazonium salt solution was then added slowly to the coupling solution while mixing vigorously. The color change was immediate to dark black-red solution, and ultimately to a yellowish-red (orange) slurry of precipitated dyestuff. The mixture was stirred for at least 2 hours while warming up to room temp, then filtered and reslurried with about 600 mL of deionized water to produce an orange-colored slurry of Lithol Rubine-Potassium salt dye having solids content of about 3.75%-wt.

Step 2: Laking Step to Produced Nano-Sized Particles of Pigment Red 57:1

Into a 1-L resin kettle equipped with mechanical stirrer and condenser was charged 265 g of aqueous slurry of Lithol Rubine-Potassium salt dye prepared from Step 1 of Example 2 above, having approximately 3.75%-wt solids content). The pH of the slurry was adjusted to at least 9.0 or higher by addition of 0.5 M KOH solution, after which the dyestuff was fully dissolved. An aqueous solution 5 wt % Dresinate X (20.0 mL) was added while stirring, followed by a solution containing sodium dioctyl sulfosuccinate (4.8 g) dissolved in 220 mL of 90:10 deionized water/THF mixture was slowly added to the mixture with stirring. An aqueous solution of calcium chloride dihydrate (0.5 M solution, 65 mL) was added dropwise to the slurry while stirring vigorously. A red precipitate formed immediately, and after complete addition of the calcium chloride solution, the slurry was stirred for an additional 1 hour. The red slurry was then heated to about 60° C. for 30 min, then cooled immediately in a cold water bath. The slurry was filtered under high vacuum through a 0.8 micron Versapor membrane cloth (obtained from PALL Corp.), then reslurried twice with about 750 mL portions of DIW, and filtered once more. The pH and conductivity of the final wash filtrate was 7.5 and about 208 µS/cm, respectively. The red pigment filtercake was reslurried in about 600 mL of deionized water and freeze-dried for 48 hours, to afford a dark red-colored powder (12.75 grams). Transmission electron microscopy images of the powder revealed predominantly platelet-like particles with particle diameters ranging from 50-150 nm, and aspect ratios that were equal to or less than about 3:1

Example 4

Preparation of Nano-Sized Particles of Pigment Red 57:1 Using the Two-Step Method Into a 250 mL round bottom flask equipped with mechanical stirrer and condenser was charged 10 g of aqueous slurry of Lithol Rubine-Potassium salt dye precursor prepared as in Step 1 of Example 3, except that the solids concentration in the aqueous slurry was about 10.0 wt %. The pH of the slurry was adjusted to at least 9.0 or higher by addition of 0.5 M KOH solution, after which the dyestuff was fully dissolved. An aqueous solution 5 wt % Dresinate X (1.0 mL) was added, followed by a 0.05 mol/L solution (34.5 mL) containing sodium dioctyl sulfosuccinate dissolved in 90:10 deionized water/THF. No visible change was observed. An aqueous solution of calcium chloride dihydrate (1.0 M solution, 2.15 mL) was added dropwise by syringe pump to the slurry while stirring vigorously. A red precipitate formed immediately, and then the slurry was stirred at room temperature for an additional 30 min. The red slurry was then filtered under high vacuum through a 0.8 µm Versapor membrane cloth (obtained from PALL Corp.), then reslurried twice with 50 mL portions of deionized water and filtered each time after reslurrying. The pH and conductivity of the final wash filtrate was 7.5 and about 135 µS/cm, respectively, indicating that residual acids and salt by-products were removed. The red pigment filtercake was reslurried in about 30 mL of deionized water and freeze-dried for 48 hours to afford a dark red colored powder (1.32 grams). Transmission electron microscopy images of the powder revealed very small platelet-like particles with particle diameters ranging from 50 to 175 nm, and aspect ratios were equal to or less than about 3:1. Dynamic Light Scattering analysis measured an average particle size, $d_{50}$, of 189 nm and GSD of 1.54 (Z-average particle size of 176 nm; polydispersity index, PDI, of 0.143). $^1$H-NMR spectroscopy analysis (300 MHz, DMSO-$d_6$) of the material indicated that the pigment adopted the hydrazone tautomer form, and that the dioctyl sulfosuccinate stabilizer compound was present at a level ranging from approximately 50-75 mol %.

Example 5

Preparation of Small Particles of Pigment Red 57:1 Using the Two-Step Method

Into a 500 mL round bottom flask equipped with mechanical stirrer and condenser was charged 126 g of aqueous slurry of Lithol Rubine-Potassium salt dye precursor (prepared as in Step 1 of Example 1) having about 1.6% wt solids content. The pH of the slurry was adjusted to at least 9.0 or higher by addition of 0.5 M KOH solution, after which the dyestuff was fully dissolved. An aqueous solution 5 wt % Dresinate X (4.0 mL) was added, followed by a solution containing sodium dioctyl sulfosuccinate (1.92 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 µm Nylon membrane cloth, then reslurried twice with 75 mL portions of DIW. The pH and conductivity of the final wash filtrate was 7.75 and conductivity of about 500 µS/cm. The red pigment filtercake was reslurried in about 250 mL of DIW and freeze-dried for 48 hours to afford a dark red-colored powder (2.73 grams). Transmission electron microscopy images of the powder showed a distribution of particle sizes, with diameter ranging from 50 to 400 nm and having particle morphologies that were predominantly platelets.

Example 6

Preparation of Small Particles of Pigment Red 57:1 Using a Two-Step Method

The sterically bulky stabilizer compound used was potassium salt of 2-hexyldecanoic acid, prepared by treatment of 2-hexyldecanoic acid with potassium hydroxide dissolved in THF, after which the THF solvent was removed. Into a 500-mL round-bottom flask equipped with condenser and mechanical stirrer was charged 126 g of aqueous slurry of Lithol Rubine-Potassium salt (prepared as in Step 1 of Example 1) having about 1.6% wt solids content. The pH of the slurry was adjusted to at least 9.0 or higher by addition of 0.5 M KOH solution, after which the dyestuff was fully dissolved. An aqueous solution 5 wt % Dresinate X (4.0 mL) was added, followed by a solution containing potassium 2-hexyldecanoate (1.28 g) dissolved in 100 mL of 80:20 deionized water/THF mixture, added dropwise while stirring vigorously. An aqueous solution of calcium chloride dihydrate (0.5 M solution, 13 mL) was added to the slurry while stirring vigorously causing a bluish-red pigment precipitate to form.

The slurry was stirred for 1 hour, heated to about 75° C. for 20 min, then cooled to room temperature. The slurry was filtered under high vacuum through a 0.8 μm Nylon membrane cloth, then reslurried once with 150 mL of DIW and filtered again. The pH and conductivity of the final wash filtrate was pH 8.38 and conductivity of about 63 μS/cm. The red pigment 57:1 filtercake was reslurried into about 150 mL of DIW and freeze-dried for 48 hours to afford a red powder (2.95 grams). TEM micrograph images showed a distribution of particle sizes, with diameters ranging from 50 to about 400 nm and having particle morphologies that included platelets as well as rods.

Example 7

Preparation of Pigment Red 57:1 Particles Using the Two-Step Method

Into a 250 mL round bottom flask equipped with mechanical stirrer and condenser was charged 25 g of aqueous slurry of Lithol Rubine-Potassium salt dye precursor prepared as in Step 1 of Example 3, except that the solids concentration in the aqueous slurry was about 4.0 wt %. The pH of the slurry was adjusted to at least 9.0 or higher by addition of 0.5 M KOH solution, after which the dyestuff was fully dissolved. An aqueous solution of 5 wt % Dresinate X (1.0 mL) was added, followed by a 0.05 mol/L solution (11 mL) containing sodium dioctyl sulfosuccinate dissolved in 90:10 deionized water/THF. No visible change was observed. An aqueous solution of calcium chloride dihydrate (0.5 M solution, 6.5 mL) was added dropwise by syringe pump to the slurry while stirring vigorously. A red precipitate formed immediately, and then the slurry was stirred at room temperature for an additional 30 min. The red slurry was then filtered under high vacuum through a 0.8 μm Versapor membrane cloth (obtained from PALL Corp.), then reslurried twice with 50 mL portions of deionized water and filtered each time after reslurrying. The pH and conductivity of the final wash filtrate was 6.7 and about 22.5 μS/cm, respectively, indicating that residual acids and salt by-products were removed. The red pigment filtercake was reslurried in about 30 mL of deionized water and freeze-dried for 48 hours to afford a dark red colored powder (0.92 grams). Transmission electron microscopy images of the powder revealed irregular rod-like particles with particle diameters ranging from 100-600 nm with the majority of particles less than about 300 nm, and aspect ratios of greater than about 4:1. Dynamic Light Scattering analysis measured an average particle size, $d_{50}$, of 259 nm and GSD of 1.60 (Z-average particle size of 224 nm; polydispersity index, PDI, of 0.145).

Example 8

Preparation of Pigment Red 57:1 Particles Using the Two-Step Method

Into a 250 mL round bottom flask equipped with mechanical stirrer and condenser was charged 25 g of aqueous slurry of Lithol Rubine-Potassium salt dye precursor prepared as in Step 1 of Example 3, except that the solids concentration in the aqueous slurry was about 4.0 wt %. The pH of the slurry was adjusted to at least 9.0 or higher by addition of 0.5 M KOH solution, after which the dyestuff was fully dissolved. An aqueous solution of 5 wt % Dresinate X (4.0 mL) was added, followed by a 0.25 mol/L solution (2 mL) containing sodium dioctyl sulfosuccinate dissolved in 90:10 deionized water/THF. No visible change was observed. An aqueous solution of calcium chloride dihydrate (1.0 M solution, 2 mL) was added dropwise by syringe pump to the slurry while stirring vigorously. A red precipitate formed immediately, and then the slurry was stirred at room temperature for an additional 30 min. The red slurry was then filtered under high vacuum through a 0.8 μm Versapor membrane cloth (obtained from PALL Corp.), then reslurried twice with 50 mL portions of deionized water and filtered each time after reslurrying. The pH and conductivity of the final wash filtrate was 6.9 and about 75.4 μS/cm, respectively, indicating that residual acids and salt by-products were removed. The red pigment filtercake was reslurried in about 30 mL of deionized water and freeze-dried for 48 hours to afford a dark red colored powder (0.70 grams). Transmission electron microscopy images of the powder revealed large rod-like particles with particle diameters ranging from 180-900 nm with the majority of particles less than about 400 nm, and aspect ratios of greater than about 4:1. Dynamic Light Scattering analysis measured an average particle size, $d_{50}$, of 269 nm and GSD of 1.64 (Z-average particle size of 252 nm; polydispersity index, PDI, of 0.185).

Example 9

Preparation of Pigment Red 57:1 Particles Using the Two-Step Method

Into a 250 mL round bottom flask equipped with mechanical stirrer and condenser was charged 25 g of aqueous slurry of Lithol Rubine-Potassium salt dye precursor prepared as in Step 1 of Example 3, except that the solids concentration in the aqueous slurry was about 4.0 wt %. The pH of the slurry was adjusted to at least 9.0 or higher by addition of 0.5 M KOH solution, after which the dyestuff was fully dissolved. An aqueous solution of 5 wt % Dresinate X (4.0 mL) was added, followed by a 0.05 mol/L solution (34.5 mL) containing sodium dioctyl sulfosuccinate dissolved in 90:10 deionized water/THF. No visible change was observed. An aqueous solution of calcium chloride dihydrate (1.0 M solution, 2 mL) was added dropwise by syringe pump to the slurry while stirring vigorously. A red precipitate formed immediately, and then the slurry was stirred at room temperature for an additional 30 min. The red slurry was then filtered under high vacuum through a 0.8 μm Versapor membrane cloth (obtained from PALL Corp.), then reslurried twice with 50 mL portions of deionized water and filtered each time after reslurrying. The pH and conductivity of the final wash filtrate was 6.8 and about 77 μS/cm, respectively, indicating that residual acids and salt by-products were removed. The red pigment filtercake was reslurried in about 30 mL of deionized water and freeze-dried for 48 hours to afford a dark red colored powder (0.62 grams). Transmission electron microscopy images of the powder revealed platelets as well as rod-like particles with particle diameters ranging from 100-400 nm with the majority of particles less than about 250 nm, and aspect ratios of less than about 4:1. Dynamic Light Scattering analysis measured an average particle size, $d_{50}$, of 235 nm and GSD of 1.61 (Z-average particle size of 224 nm; polydispersity index, PDI, of 0.152).

Example 10

Preparation of Small Particles of Pigment Red 57:1 Using the Two-Step Method

Into a 250 mL round bottom flask equipped with mechanical stirrer and condenser was charged 10 g of aqueous slurry of Lithol Rubine-Potassium salt dye precursor prepared as in Step 1 of Example 3, except that the solids concentration in the aqueous slurry was about 10.0 wt %. The pH of the slurry was adjusted to at least 9.0 or higher by addition of 0.5 M KOH solution, after which the dyestuff was fully dissolved. An aqueous solution of 5 wt % Dresinate X (4.0 mL) was added, followed by a 0.05 mol/L solution (11 mL) containing sodium dioctyl sulfosuccinate dissolved in 90:10 deionized water/THF. No visible change was observed. An aqueous solution of calcium chloride dihydrate (1.0 M solution, 3.25 mL) was added dropwise by syringe pump to the slurry while stirring vigorously. A red precipitate formed immediately, and then the slurry was stirred at room temperature for an additional 30 min. The red slurry was then filtered under high vacuum through a 0.8 μm Versapor membrane cloth (obtained from PALL Corp.), then reslurried twice with 50 mL portions of deionized water and filtered each time after reslurrying. The pH and conductivity of the final wash filtrate was 7.5 and about 42.7 μS/cm, respectively, indicating that residual acids and salt by-products were removed. The red pigment filter-cake was reslurried in about 30 mL of deionized water and freeze-dried for 48 hours to afford a dark red colored powder (0.61 grams). Transmission electron microscopy images of the powder revealed platelets as well as rod-like particles with particle diameters ranging from 75 nm to about 300 nm with the majority of particles less than about 200 nm, and aspect ratios of less than about 3:1. Dynamic Light Scattering analysis measured an average particle size, $d_{50}$, of 209 nm and GSD of 1.57 (Z-average particle size of 193 nm; polydispersity index, PDI, of 0.148).

Examples of Liquid Dispersions containing Monoazo Laked Pigment Particles (Including Nano-Sized Particles) and Their Coloristic Properties Example 11

Method for Preparation of Liquid Dispersions and of Polymer Coatings

A series of liquid, non-aqueous dispersions were prepared using a polymeric dispersant and the nano-sized PR 57:1 pigments from Examples 1, 2, 3, 4, 5 and 6; the larger-sized pigment particles prepared as described in the Comparative Example 1; as well as two commercial sources of PR 57:1 obtained from Clariant (lot #L7B01) and Aakash. Coatings on clear Mylar film were prepared from these liquid dispersions, and evaluated in the following manner: Into a 30 mL amber bottle was added 0.22 g of pigment, 0.094 g polyvinylbutyral (B30HH obtained from Hoescht), 7.13 g n-butyl acetate (glass-distilled grade, obtained from Calcdon Laboratories) and 70.0 g of ⅛" stainless steel shot (Grade 25 440C obtained from Hoover Precision Products). The bottles were transferred to a jar mill and were allowed to gently mill for 4 days at 100 RPM. Two draw-down coatings were obtained for each dispersion using an 8-path gap on clear Mylar film such that the wet thicknesses for each coating comprised of PR 57:1 pigment sample were 0.5 and 1 mil. The air-dried coatings on clear Mylar film were then dried in a horizontal forced-air oven at 100° C. for 20 minutes.

Example 12

Measurement of Pigment Particle Size by Dynamic Light Scattering

The measurements of various example PR57:1 pigments' particle sizes were performed on a Malvern ZetaSizer HT at 25° C. Each of the pigment dispersions prepared in Example 8 were diluted in a solution of polyvinylbutyral (B30HH obtained from Hoescht) in n-butyl acetate (glass-distilled grade, obtained from Calcdon Laboratories) and sonicated at low power for 1 minute. For each determination of particle size and distribution, 3 replicates of 12 runs were performed wherein the repeatability of particle size data was realized for each sample. The particle size data for the diluted samples that were prepared in Example 8 can be found in Table 10.

Example 13

Evaluation of Coatings prepared from Liquid Pigment Dispersions

The coatings on clear Mylar film prepared as described in Example 11 were assessed for coloristic and light scattering properties in the following manner: The UVVIS/NIR transmittance spectra of each coating were obtained using a Shimadzu UV160 spectrophotometer, and the results showed dramatically reduced light scattering and remarkable specular reflectivity for the nano-sized PR57:1 pigment samples described herein, compared with the spectra of coatings prepared with commercial PR57:1 pigment samples obtained from Clariant and Aakash. The degree of light scattering in a coating is dependent on both the size and shape distributions of the pigment particles and their relative dispersability within the coating matrix, and the Normalized Light Scatter Index (NLSI) method was developed to be a measure of this characteristic for the pigmented coatings. NLSI is quantified by first measuring the spectral absorbance of the coating in a region where there is no absorbance from the chromogen of the monoazo laked pigment (for PR57:1, a suitable region is 700-900 nm), but only absorbance due to light scattered from large aggregates and/or agglomerated pigment particles dispersed in the coating binder. The Normalized Light Scatter Index (NLSI) is then obtained by normalizing each of the samples' light scattering indices (from 700 to 900 nm) to a lambda-max optical density=1.5. In this way, the degree of light scattering for each pigmented coating could be compared directly against each other. The lower the NLSI value, the smaller the inferred particle size of the dispersed pigment in the coating. A relationship between decreasing average particle size and decreasing NLSI value was found to exist with the coatings prepared from the example pigments shown in Table 8. In particular, the nano-sized monoazo laked pigment PR57:1 of Example 3 had by far the lowest degree of light scattering, with an NLSI value of 0.3. The coloristic properties of the Mylar coatings were determined using an X-RITE 938 spectrodensitometer. L* a* b* and optical density (O.D.) values were obtained for each of the samples, and the L* a* b* were normalized to an optical density of 1.5, and used to calculate the hue angle and chroma (C*), as listed in Table 8.

TABLE 8

Normalized Light Scatter Indices (NLSI), Coloristic properties normalized to
O.D. = 1.5, Particle size ranges and Dispersion stabilities of example PR57:1 pigments

| Metric | Clariant PR57:1 | Aakash PR57:1 | Comparative Example 1 | Example 1 | 2 | 3 | 4 | 5 | 6 | 7 | 8 | 9 | 10 |
|---|---|---|---|---|---|---|---|---|---|---|---|---|---|
| L*[a] | 47.9 | 48.0 | 44.8 | 50.8 | 50.6 | 51.7 | 53.0 | 49.9 | 49.6 | 50.1 | 49.0 | 50.8 | 52.0 |
| a*[a] | 71.1 | 71.2 | 71.5 | 76.5 | 77.2 | 79.4 | 78.8 | 76.7 | 73.6 | 76.4 | 74.7 | 77.2 | 77.7 |
| b*[a] | 8.7 | 17.5 | 34.8 | −16.4 | −17.4 | −18.8 | −15.0 | −18.9 | 1.4 | −2.4 | 6.1 | −5.8 | −12.5 |
| Hue Angle (°)[a] | 6.6 | 13.8 | 28.1 | 347.9 | 347.1 | 346.6 | 349.2 | 346.1 | 0.9 | 358.3 | 4.6 | 355.8 | 350.9 |
| C*[a] | 72.6 | 73.4 | 78.1 | 78.6 | 77.5 | 81.3 | 80.5 | 78.9 | 73.9 | 78.2 | 76.7 | 78.9 | 79.9 |
| Particle Size Diameter Range[b] (nm) | ~50 to ~400 | ~50 to ~400 | ~200 to ~700 | ~30 to ~150 | ~50 to ~175 | ~50 to ~150 | ~50 to ~175 | ~50 to ~400 | ~50 to ~400 | ~100 to ~600; most <300 nm | ~180 to ~900; most <400 nm | ~100 to ~400; most <250 nm | ~75 to ~300; most <200 nm |
| Normalized Light Scatter Index[a] | 5.5 | 9.9 | 74.1 | 0.3 | 1.3 | 1.0 | 0.7 | 0.9 | 4.8 | 1.8 | 2.2 | 1.5 | 0.4 |
| Dispersion Stability | 2 days | 2 days | <1 day | 6 months | 3 months | 3 months | 3 months | 6 months | 2 months | 3 months | 3 months | 3 months | 3 months |

In Table 8,
[a] denotes that the various coloristic and light scatter index metrics were normalized to optical density of 1.5, and,
[b] denotes that the particle size diameter was determined by Transmission Electron Microscopy.

For the data in Table 9, the various coloristic properties, normalized light scatter indices, of the example pigments as they were dispersed and coated onto Clear Mylar® and the dispersion stabilities found in Table 8 have been organized into various ranges by way of the following:

a) [1]L*, where A denotes 49≦L*≦54, B denotes L*>54, C denotes L*<49, b) [2]a*, where A denotes a*≧78, B denotes 75≦a*<78, C denotes a*<75, c) [3]b*, where A denotes b*≦−18, B denotes −10≦b*<−18, C denotes −2≦b*<−10, D denotes 6≦b*<−2, E denotes b*>6, d) [4]NLSI, where A denotes NLSI≦1, B denotes 1<NLSI≦2, C denotes NLSI>2, and e) [5]Dispersion Stability at Room Temperature, where A denotes stability ≧3 months, B denotes stability ≧1 week but <3 months, C denotes stability <1 week.

From table 9, it is clear that a variety of coloristic properties can be realized by adjusting the synthetic process of nano-sized PR57:1 to suit pigment compositions having relatively smaller particle sizes, relatively larger particle sizes or a combination of particle sizes to suit the needs of a particular application. For example, it may useful in a particular application, such as in ink formulations, to have the ability to tune the coloristic properties of an ink, a magenta ink, for example, without using excessive energy to grind down the pigment particles. The ability to control various properties of nano-sized PR57:1, such as hue angle, as determined from its synthesis and work-up history, is beneficial to the environment as lower energy consumption would be required to process a dispersion or ink for a given application, such as for coatings or ink jet inks, such as piezo inkjet inks.

TABLE 9

Ranged and Normalized Scatter Indices (NLSI), Coloristic and Dispersion
Stability Properties of example PR57:1 pigments, normalized to O.D. = 1.5

| Metric | Clariant PR57:1 | Aakash PR57:1 | Comparative Example 1 | Example 1 | 2 | 3 | 4 | 5 | 6 | 7 | 8 | 9 | 10 |
|---|---|---|---|---|---|---|---|---|---|---|---|---|---|
| L*[1] | C | C | C | A | A | A | A | A | A | A | A | A | A |
| a*[2] | C | C | C | B | B | A | A | B | C | B | C | B | B |
| b*[3] | E | E | E | B | B | A | B | A | D | C | E | C | B |
| Normalized Light Scatter Index[4] | C | C | C | A | B | A | A | A | C | B | C | B | A |
| Dispersion Stability[5] | C | C | C | A | A | A | A | A | A | A | A | A | A |

Example 14 b*a* Coloristic Properties of Coatings prepared from Liquid Pigment Dispersions

Figure 2:
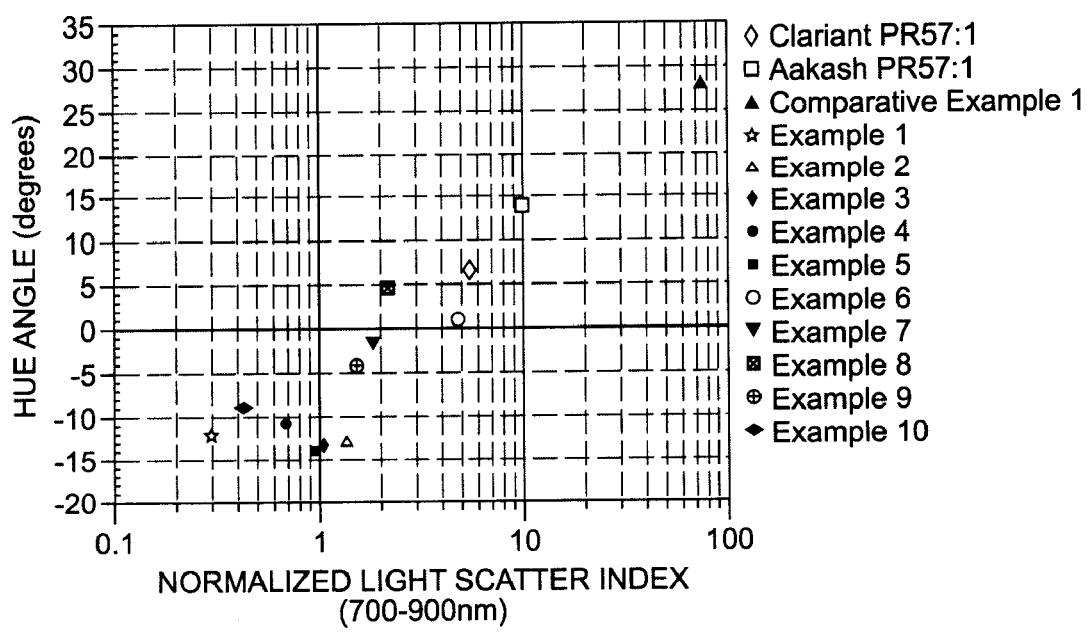
FIG. 2 shows a relationship between hue angle and normalized light scatter index (NLSI) for pigmented coatings on Mylar film, prepared according to embodiments (Magenta Optical Density=1.5).

The graphs in FIGS. 1 and 2 visually illustrate the significant shifts in b* a* gamut observed with coatings prepared with the nano-sized PR57:1 pigments from Examples 1, 2, 3, 4 and 5, in addition to the extended C* chroma for the nano-sized pigment examples. Furthermore, the graph in FIG. 1 shows a clear blue-shifting of hue that directly corresponds to decreasing particle size/particle diameters of the example PR57:1 pigments, a relationship which is also inferred from the Normalized Light Scatter Index (NLSI) values of Table 8. (Note: For ease of generating the graph, the b* vertical axis shows "negative" hue angles, which represent the number of degrees <360 degrees.) The light scattering and coloristic data accumulated provide evidence for the ability to tune color properties and specular reflectivity of pigmented coatings with tunable particle size of surface-enhanced fine particles of monoazo laked red pigments, in particular Pigment Red 57:1. This is achieved by using the methods of making such nano-sized pigments of PR57:1 as described herein, in particular using the two-step process which uses sterically bulky stabilizer compounds to limit particle aggregation and thereby limit particle size as well as enhance dispersion and color characteristics of the nano-sized pigment particles. Furthermore, the ability to easily tune color properties of such monoazo laked pigments provides a means to control the color quality so that inexpensive azo laked pigments like PR57:1 can be used to obtain magenta color that are normally exhibited by higher cost red pigments, such as the quinacridone-type Pigment Red 122 and Pigment Red 202.

Figure 3:
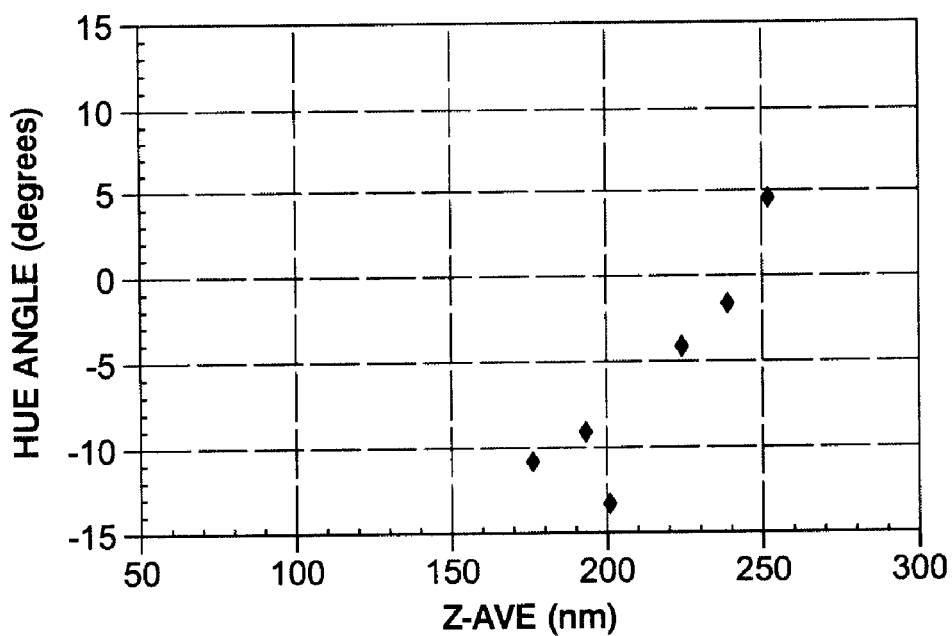
FIG. 3 shows a relationship between hue angle of pigmented coatings and Z-average particle size prepared with example PR57:1 pigments (Magenta Optical Density=1.5).

It can be seen from the data in FIG. 2 that there is a semi-logarithmic correlation between hue angle and Normalized Light Scatter Index (NLSI) of the example PR57:1 pigments, normalized to an optical density of 1.5. The relatively greater degree of blue-shifting of hue for some example pigments, especially those made in Examples 1, 2, 3, 4, and 5 occurred with correspondingly lower NLSI values. As well, red-shifting of hue for some example pigments occurred with correspondingly higher NLSI values. Furthermore, the direct correlation between hue angle of example pigments coated onto clear Mylar® (normalized to O.D.=1.5) and of particle size (prepared and measured as Z-average as disclosed in Example 9) as seen in FIG. 3 clearly indicate a range of hue angles (colors) suitable for various applications, such as inks or coatings. Thus various properties of example PR57:1 pigments can be easily, including pigment particle size and dispersed pigment hue, by adjusting certain aspects of the PR57:1 composition and method of making, including, for example, reactant loading and stoichiometry, reactants rate of addition and concentration, stirring speed, temperature and various pigment work up variances, including types and volumes of pigment washes.

Figure 4:
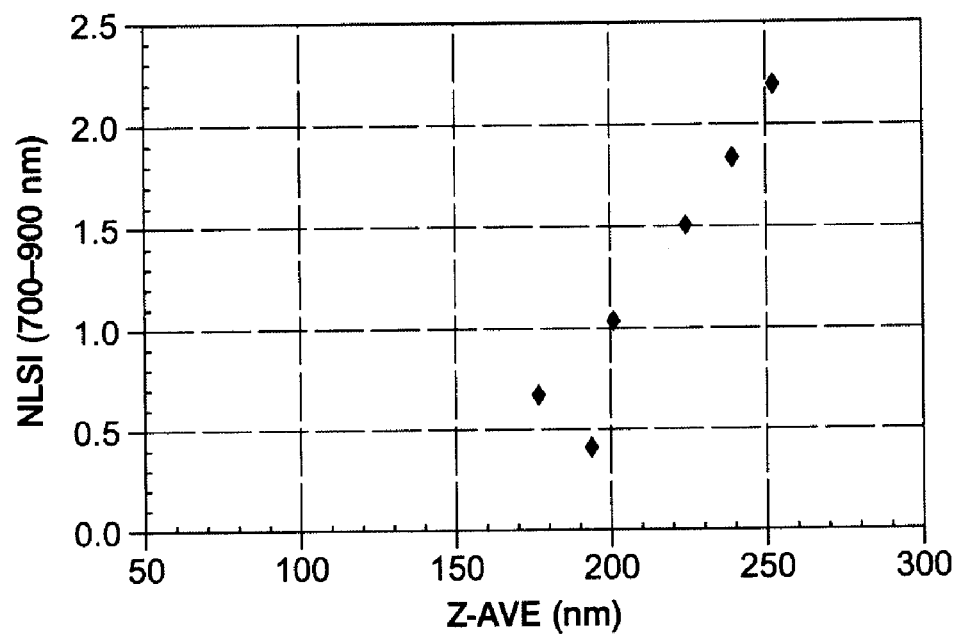
FIG. 4 shows a relationship between normalized light scatter index of pigmented coatings and Z-average particle size prepared with example PR57:1 pigments (Magenta Optical Density=1.5).

FIG. 4 shows the nearly linear correlation between NLSI and Z-average particle size indicating that the particle size distributions in the dispersions made with example PR57:1 pigments were retained in the coatings, after evaporation of n-butyl acetate by oven drying, as inferred by the NLSI data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanoscale pigment particle composition, comprising:
   an organic monoazo laked pigment having at least one functional moiety, and
   a sterically bulky stabilizer compound having at least one functional group,
   wherein the functional moiety on the pigment associates non-covalently with the functional group of the stabilizer; and
   the nanoscale pigment particles have an average particle size of from about 10 nm to about 500 nm and have coloristic properties that are changeable in accordance with both particle composition and average particle size.

2. The composition of claim 1, wherein the nanoscale pigment particles have an average particle diameter, as derived from transmission electron microscopy imaging, of less than about 200 nm.

3. The composition of claim 1, wherein the nanoscale pigment particles have an average particle size ($d_{50}$ or Z-average), as derived by dynamic light scattering analysis methods, of less than about 250 nm.

4. The composition of claim 1, wherein the nanoscale pigment particles have an average particle size, as derived by transmission electron microscopy imaging, of from about 25 nm to about 150 nm.

5. The composition of claim 1, wherein the nanoscale pigment particles have a geometric standard deviation, as derived by dynamic light scattering analysis methods, of from about 1.1 to about 1.8.

6. The composition of claim 1, wherein the nanoscale pigment particles have a shape selected from the group consisting of rods, platelets, needles, prisms, ellipsoids, and nearly spherical, and have an aspect ratio (length:width) of from about 1:1 to about 5:1.

7. The composition of claim 1, wherein the coloristic properties are measured when the nanoscale pigment particles are dispersed in a polymer binder.

8. The composition of claim 1, wherein the coloristic properties are directly correlated with variable average particle size, as derived by dynamic light scattering analysis methods.

9. The composition of claim 1, wherein the coloristic properties are selected from the group consisting of L*, a*, b*, chroma C*, hue angle, normalized Light Scatter Index (NLSI), and combinations thereof.

10. The composition of claim 1, wherein the nanoscale pigment particles exhibit a hue angle, as derived from a 2-dimensional b* a* color gamut space, ranging from about 345° to about 0°.

11. The composition of claim 1, wherein the nanoscale pigment particles exhibit a hue angle measured on a 2-dimensional b* a* color gamut space of from about 345° to about 355°.

12. The composition of claim 1, wherein the nanoscale pigment particles exhibit a NLSI value, determined as a degree of spectral absorbance due to particle light scattering in a near-infrared spectral region between 700-900 nm, ranging from about 0.1 to about 3.0.

13. The composition of claim 1, wherein the nanoscale pigment particles exhibit a NLSI value of from about 0.1 to about 1.5.

14. The composition of claim 1, wherein the nanoscale pigment particles have enhanced chroma as compared to a similar organic monoazo laked pigment not having the sterically bulky stabilizer compound and not having nanoscale-sized particles.

15. The composition of claim 1, wherein the nanoscale pigment particles exhibit a hue angle, as derived from a 2-dimensional b* a* color gamut space, ranging from about 345° to about 0° and a NLSI value, calculated from spectral absorbance in the near-infrared spectral region between 700-900 nm, ranging of from about 0.1 to about 3.0.

16. The composition of claim 1, wherein the nanoscale pigment particles exhibit a hue angle, as derived from a 2-dimensional b* a* color gamut space, ranging from about 345° to about 355°, and a NLSI value, calculated from spectral absorbance in the near-infrared spectral region between 700-900 nm, ranging from about 0.1 to about 1.0.

* * * * *